United States Patent [19]
Ogawa

[11] Patent Number: 5,309,424
[45] Date of Patent: May 3, 1994

[54] OPTICAL RECORDING APPARATUS RECORDING BEAM CONTROLLED IN RESPONSE TO REDUCED LIGHT LEVEL REFLECTED BETWEEN SUCCESSIVELY FORMED PITS

[75] Inventor: Hiroshi Ogawa, Tokyo, Japan

[73] Assignee: Sony Corporation, Tokyo, Japan

[21] Appl. No.: 42,831

[22] PCT Filed: Jun. 13, 1990

[86] PCT No.: PCT/JP90/00772

§ 371 Date: Feb. 5, 1991

§ 102(e) Date: Feb. 5, 1991

[87] PCT Pub. No.: WO90/16065

PCT Pub. Date: Dec. 27, 1990

Related U.S. Application Data

[63] Continuation of Ser. No. 640,433, Feb. 5, 1991, abandoned.

[30] Foreign Application Priority Data

Jun. 20, 1989 [JP] Japan ................................. 1-157342

[51] Int. Cl.$^5$ ................................................ C11B 7/00
[52] U.S. Cl. ........................................ 369/116; 369/54; 369/58; 369/50; 369/44.34
[58] Field of Search ........................ 369/47, 48, 49, 50, 369/54, 58, 32, 116, 124, 109, 44.28, 44.34, 110

[56] References Cited

U.S. PATENT DOCUMENTS

| | | | |
|---|---|---|---|
| 4,894,816 | 1/1990 | Sukeda et al. | 369/116 |
| 4,949,311 | 8/1990 | Barnard | 369/116 |
| 5,109,366 | 4/1992 | Moriya et al. | 369/44.34 |

FOREIGN PATENT DOCUMENTS

| | | |
|---|---|---|
| 109130 | 5/1984 | European Pat. Off. . |
| 219124 | 4/1987 | European Pat. Off. . |
| 299573 | 1/1989 | European Pat. Off. . |

*Primary Examiner*—W. R. Young
*Assistant Examiner*—Muhammad N. Edun
*Attorney, Agent, or Firm*—Lewis H. Eslinger; Jay H. Maioli

[57] ABSTRACT

An optical recording apparatus includes a control unit 37 performing a control operation by forming control data on the basis of a detection output by detection units 12, 13 during a minimum time domain $T_S$ of a recording data pulse after lapse of a predetermined time until the end of formation of a pit P on an optical recording medium 1 by a recording light beam from a laser light source 11. The optical recording apparatus drives the laser light source 11 between one record data and the following record data with a reproducing level light volume $L_B$ to perform data recording on the optical recording medium 1 while performing control operations by the control unit 37 on the basis of the above control data.

3 Claims, 3 Drawing Sheets

OPTICAL RECORDING APPARATUS RECORDING BEAM CONTROLLED IN RESPONSE TO REDUCED LIGHT LEVEL REFLECTED BETWEEN SUCCESSIVELY FORMED PITS

This is a continuation of application Ser. No. 07/640,433 filed Feb. 5, 1991, abandoned.

TECHNICAL FIELD

This invention relates to an optical recording apparatus for recording data by irradiating an optical recording medium with a light beam for pit formation.

BACKGROUND ART

Recently, a disk-shaped recording medium, such as an optical disc or a magneto-optical disc, utilizing the optical or magneto-optical signal recording/reproducing method, has been developed and presented to the market. As such disc-shaped recording medium, there are known a recording medium of the read-only-memory type (ROM) such as a so-called compact disc (CD), a so-called write once type recording medium on which data can be written only once by the user, and a so-called overwrite type disc, such as a magneto-optical disc, on which data re-recording is possible.

With a recording/reproducing apparatus for an optical disc, in which data are recorded or read out on or from the above mentioned write once type or overwrite type optical disc, the recording track on the optical disc is scanned by a light beam for data recording and/or reproduction, whilst the optical disc is rotationally driven at a constant angular velocity or at a constant linear velocity by spindle servo, and whilst focusing servo and/or tracking servo are supplied to an optical head on the basis of detection output of a photosensor adapted for sensing the light beam irradiated on and reflected back from the disc. The photosensor is enclosed within the optical head along with a laser diode which is driven by a laser driving circuit for outputting the light beam for data recording and/or reproduction.

With the recording/reproducing apparatus for an optical disc in which the recording track is scanned in this manner by the light beam for data recording and/or reproduction, if the power of the light beam scanning the recording track during the recording mode is too low, data cannot be recorded reliably, whereas, if the power of the light beam scanning the recording track during the reproducing mode is too high, serious effects may be produced, such as destruction of data recorded on the recording track. According to the Japanese Patent Kokai Publication No. 53-46633(1978), the intensity or volume of the light beam for data recording and/or reproduction is detected and the driving circuit for the laser diode adapted for outputting the laser beam is feedback controlled while a so-called APC servo loop for maintaining a constant beam power of the light beam is switched as a function of the prevailing operating modes for suitably switching the beam power.

Meanwhile, with an optical recording/reproducing apparatus in which the recording track is scanned by the light beam for recording and/or reproducing data on or from an optical recording medium, the light reflected from the optical recording medium is detected by an optical head, and the above mentioned focusing or tracking servo is performed on the basis of the resulting detection output. However, since the reflected light from the recording medium has been modulated by the pits formed on the recording track of the recording medium, that is, the recorded data, the operation of the servo system tends to be affected by the pits.

With the optical recording apparatus, the recording track on the optical recording medium is scanned by the recording light beam radiated by a laser diode driven by pulses in accordance with the record data during the recording mode, thereby forming the pits for data recording. However, inasmuch as a time delay $\Gamma$ in the order of 300 to 400 ns is produced from the time when a recording light beam obtained by driving a laser diode by driving pulses consistent with the record data is irradiated until the pits P start actually to be formed, as shown in FIG. 1, the detection output waveform of the recording light beam reflected after irradiation on the recording track is also modulated with the above defined time delay. Thus the conventional servo system operating on the basis of the reflected light of the recording light beam exhibits a strong dependency on the pattern of the pits that is, the record data, formed on the recording track, so that it becomes necessary to provide a wide dynamic range automatic gain control circuit in the servo system.

Above all, in an optical recording/reproducing apparatus employing an optical recording medium having the modulation factor by the record data signal in the order of 60 percent, which is almost as high as that of the compact disc, such as a write once type optical disc having an organic dye optical recording medium, the problem is raised in connection with the effect on the operation of the servo system of the pit pattern formed on the recording track during the recording mode.

On the other hand, there is disclosed in the JP Patent Kokoku Publication No. 63-87656(1988) an optical disc in which a pre-groove formed thereon for tracking servo is wobbled as in the case of a so-called ATIP (absolute time in pregroove) and auxiliary data or sub-data, such as absolute time information, is recorded with the wobbling frequency component as the carrier wave. However, since the return light detected by the optical head during data recording has been affected with the time delay $\Gamma$ as described above, the absolute time information cannot be reproduced satisfactorily. This is ascribable above all to the fact that indeterminate level components caused by reading the recorded pits give rise to generation of spectral components in the lower frequency range to lower the C/N ratio of the wobbling frequency to worsen the error rate during reproduction of the above mentioned absolute time data.

It is therefore an object of the present invention to provide an arrangement in which, even with an optical recording and/or reproducing apparatus in which an optical recording medium exhibiting a high modulation factor by the record data signal is used, error data of the focusing or tracking servo of the recording light beam or the wobbling time data may be detected reliably during the record mode operation to provide for a highly reliable recording operation. Thus the present invention provides an optical recording apparatus of a novel construction in which a light source for irradiating a light beam adapted for forming pits on an optical recording medium for data recording is driven by a reproducing level light volume during a time between successive data pulses for recording the data on the basis of control data obtained from the optical recording medium.

Disclosure of the Invention

The present invention provides an optical recording apparatus comprising a light source for irradiating an optical recording medium with a light beam for forming pits and recording data thereon, driving means for pulse driving said light source with a light volume at the recording level in accordance with recording data and driving said light source with a light volume at the reproducing level between successive data pulses, detecting means for detecting the return light beam irradiated by said light source and reflected by said optical recording medium, and control means for performing a control operation by forming control data from said recording medium on the basis of the detection output by said detection means after the lapse of a predetermined time interval until completion of pit formation on said optical recording medium by said recording light beam and within the minimum pulse interval of said recording data, characterized in that said light source is driven between record data and record data with a light volume of the reproducing level, and in that recording of the recording data is performed while performing control operations on the basis of control data obtained from said optical recording medium.

With the optical recording apparatus according to the present invention, the light source driven by driving means is pulse-driven with a recording level light volume in association with record data for irradiating an optical recording medium with a recording light beam, thereby forming pits on the optical recording medium for data recording, while the light source is driven between one record data and the following record data with a reproducing level light volume for irradiating a light beam necessary for detecting control data from the optical recording medium. The detection means detects the light beam irradiated by the light source and reflected back from the recording medium. After lapse of a predetermined time interval until the end of pit formation on the optical recording medium by the recording light beam, and within the minimum pulse interval or domain of the record data, control means generate control data from the optical recording medium to perform a control operation on the basis of a detection output from the detection means. The detection output by the detection means is no affected, after lapse of the predetermined time until the end of pit formation on the optical recording medium by the recording light beam and within the minimum pulse interval or domain of the record data, by the pits formed on the recording medium in association with the record data.

BEST EMBODIMENT FOR PRACTICING THE INVENTION

Figure 1:
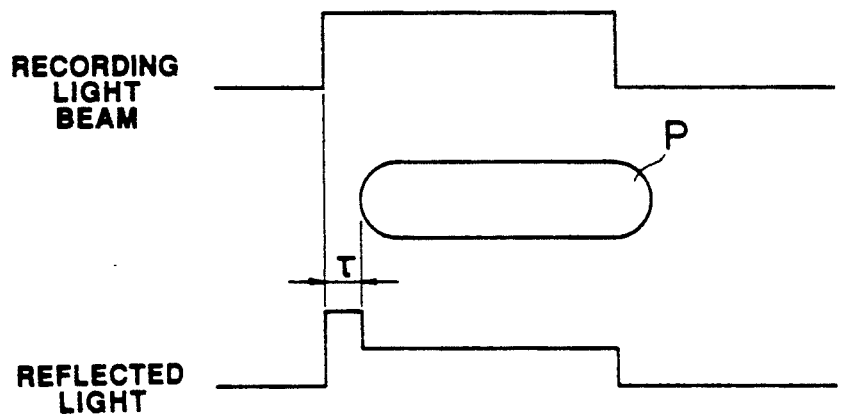
FIG. 1 is a waveform diagram showing the state of changes in the light volume of the reflected light from an optical disc in the case of forming a pit on the disc by means of a light beam.

An embodiment of the present invention will be explained by referring to the drawings.

Figure 2:
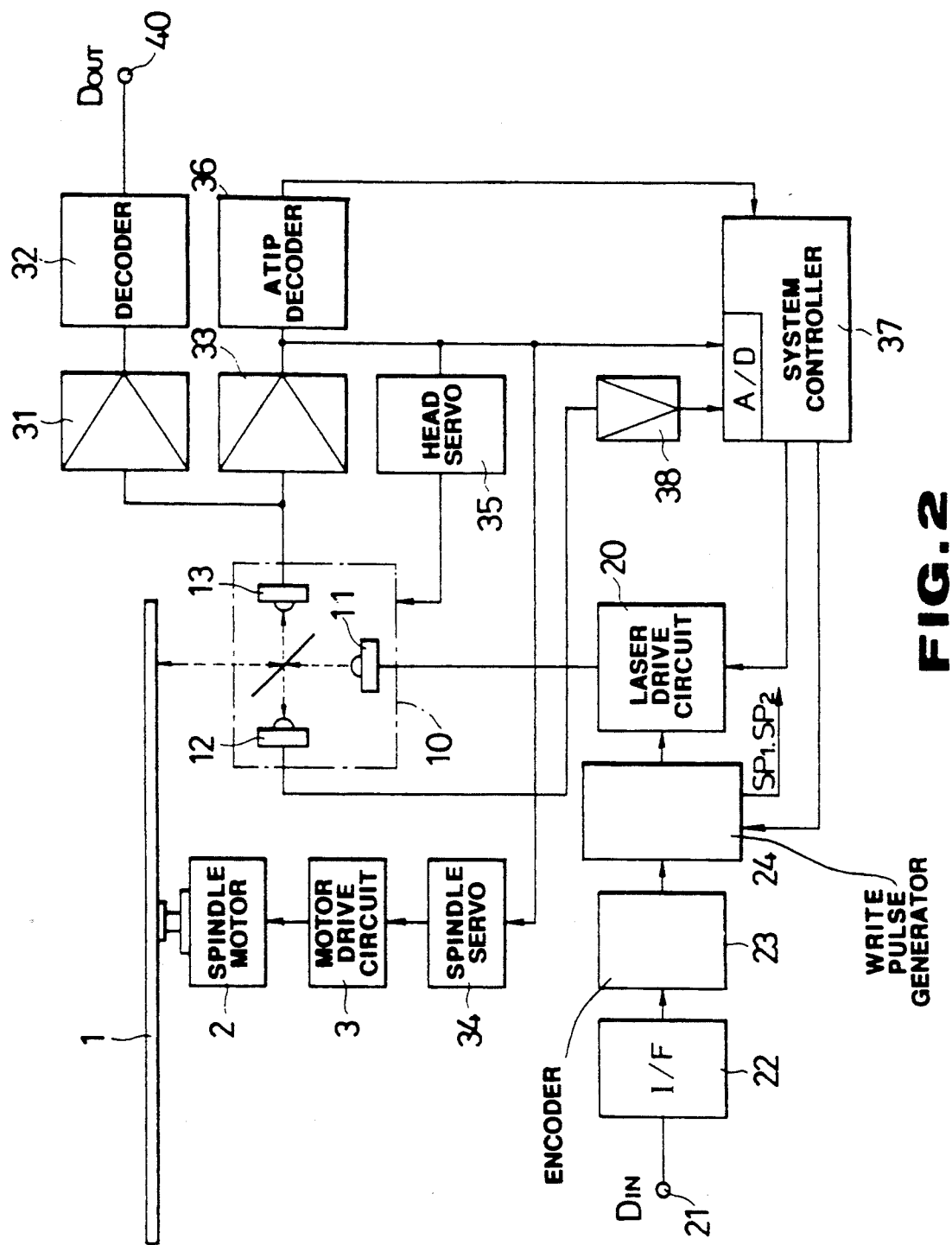
FIG. 2 is a block diagram showing the arrangement of a recording/reproducing apparatus for an optical disc to which the present invention is applied.

The block diagram of FIG. 2 shows the construction of a recording/reproducing apparatus for an optical disc to which the present invention is applied, in which an optical disc 1 formed by a write-once optical recording medium is rotationally driven by a spindle motor 2 at a constant linear velocity and the recording track on the disc 1 is scanned by the optical head 10 by a laser light to perform optical recording/reproduction of digital data in accordance with a data format consistant with the CD prescriptions.

The disc 1 is constructed according to a so-called ATIP format in which a pregroove for tracking servo is wobbled and the wobbling frequency component is modulated for pre-recording absolute time data as auxiliary sub-data.

The optical head 10 of the above described recording/reproducing apparatus for an optical disc has enclosed therein a laser diode 11 for irradiating a laser light for recording/reproducing digital data by being driven by a laser driving circuit 20, a photodetector 12 for detecting the laser light irradiated by the laser diode 11 and a photodetector 13 for detecting the laser light radiated from the laser diode 11 and reflected by the optical disc 1. The recording track on the optical disc 1 is scanned by the laser light radiated by the laser diode 11 to perform data recording/reproduction on or from the recording track.

The recording system of the recording/reproducing apparatus for the optical disc includes an encoder 23 for converting digital data $D_{IN}$ supplied for recording from an input terminal 21 by way of an input/output interface 22, a recording pulse generator 24 for affording write pulses consistent with the recording data string to the laser driving circuit 20, and as forth. The laser diode 11 of the optical head 10 is pulse-driven by a write pulse consistent with the record data string by the laser drive circuit 20, thereby recording the digital data $D_{IN}$ on the recording track of the optical disc 1 as the above mentioned recording data string of the data format consistent with the CD prescriptions.

The reproducing system of the recording/reproducing apparatus for an optical disc includes a decoder 32 to which a detection output from the photodetector 13 of the optical head 10 is supplied by way of a reproducing amplifier 31. The detection output of the laser light radiated from the laser diode 11 and reflected by the recording track of the optical disc 1 is decoded by a decoder 32 in a manner corresponding to the encoder 23 of the recording system for producing reproduced data $D_{OUT}$, which is outputted at an output terminal 40.

The control system of the recording/reproducing apparatus includes a spindle servo circuit 34 to which the detection output by the photodetector 13 of the optical head 10 is supplied by way of a reproducing amplifier 33. The spindle servo circuit 34 performs a spindle servo control that in such a manner that, on the basis of the detection output by the photodetector 13, the rotational velocity of the optical disc 1 is detected from the wobbling signal produced by the wobbled pregroove on the optical disc 1, and a motor driving circuit 3 of the spindle motor 2 is feedback controlled for maintaining the rotation of the optical disc 1 at a constant linear velocity.

The control system of the recording/reproducing apparatus for the optical disc includes a head servo circuit 35 to which the detection output by the photodetector 13 of the optical head 10 is supplied via by way of a reproducing amplifier 33. This head servo circuit 35 detects error data such as the focusing error or the tracking error of the laser light irradiated on the optical disc 1, on the basis of the detection output by the photodetector 13, and controls a biaxial actuator, not shown, driving an object lens of the optical head 10, on the basis of the thus detected error data, for performing a head servo control operation, such as focusing servo or tracking servo operations.

The control system of the recording/reproducing apparatus for an optical disc further includes an ATIP decoder 36, to which the detection output by the photodetector 13 of the optical head 10 is supplied by way of the reproducing amplifier 33. The absolute time data $D_{ATIP}$ is read from the wobbling signal produced by the wobbling pregroove on the optical disc 1 on the basis of the detection output by the photodetector 13. The absolute time data $D_{ATIP}$ obtained at the ATIP decoder 36 is supplied to a system controller 37.

The system controller 37 includes an analog/digital converting function and has an analog input port to which a detection output by the photodetector 13 of the optical head 10 is supplied from the reproducing amplifier 33. The detection output by the photodetector 12 detecting the laser light radiated by the laser diode 11 of the optical head 10 is also supplied to the system controller by way of a preamplifier 38. The photodetector 12 may be replaced by a photodetector for so-called back monitoring.

The operations of the write pulse generator 24 or the laser drive circuit 20 may be controlled by the system controller 37 in the following manner.

Figure 3:
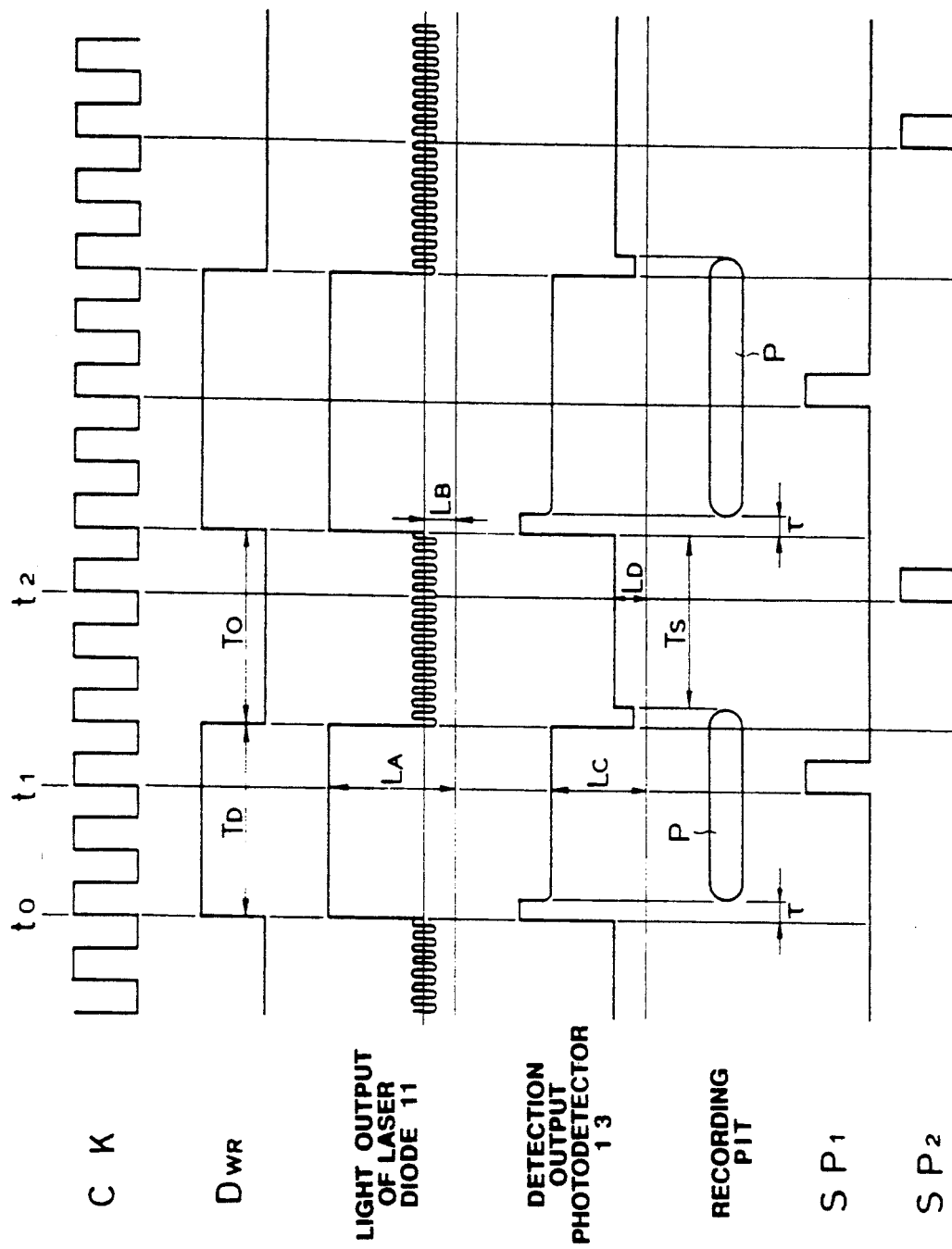
FIG. 3 is a time chart for illustrating the operation of the recording mode in the above recording/reproducing apparatus.

That is, during the recording mode, as shown in FIG. 3, a write pulse $D_{WR}$ synchronized to the data clock CK in association with the record data is applied to the laser driving circuit 20 by a write pulse generator 24. The write pulse generator 24 actuates the laser diode 11 of the optical head 10 by the laser driving circuit 20 responsive to the write pulse $D_{WR}$ to output a first sampling pulse $SP_1$ at a predetermined timing $t_1$ within an interval $T_D$ of the write pulse $D_{WR}$ after lapse of a predetermined time until actual formation of the pit P on the optical disc 1 by the recording light beam radiated by the laser diode 11. The write pulse generator also outputs a second sampling pulse $SP_2$ at a predetermined timing $t_2$ within a minimum sampling time interval $T_S$ of the write pulse $D_{WR}$ after end of the formation of the recording pit P on the optical disc 1.

With the optical recording/reproducing apparatus of the present embodiment in which digital data are optically recorded and/or reproduced in accordance with the data format consistent with the CD prescriptions, the minimum pulse interval $T_S$ of the write pulse $D_{WR}$ is set so as to correspond to the 3-channel clock interval. In the write pulse generator 24, the first sampling pulse $SP_1$ and the second sampling pulse $SP_2$ may be formed from the data clock CK corresponding to the channel clock and the record data synchronized with the data clock CK.

The laser driving circuit 20 actuates the laser diode 11 of the optical head 10 with a light volume $L_A$ of the recording level in accordance with the write pulse $D_{WR}$ and, during the time $T_O$ of each write pulse $D_{WR}$, actuates the laser diode 11 at a high frequency with a light volume $L_B$ of the reproducing level.

By the pulse driving of the laser diode 11 by the laser driving circuit 20, the recording pit P in accordance with the write pulse $D_{WR}$ is formed on the optical disc 1 by the record light beam radiated by the laser diode 11 with a predetermined time delay T, thereby performing a data recording.

In the present embodiment, the system controller 37 samples the detection output by each of the photodetectors 12, 13 of the optical head 10 by a first sampling pulse $SP_1$ generated by the write pulse generating circuit 24 and controls the operation of the laser driving circuit 20 in accordance with the sampled value to effect the following control of automatically adjusting the light volume $L_A$ of the recording light beam radiated from the laser diode 11 of the optical head 10.

That is, during the time period in which the recording pit P is actually formed on the optical disc 1 by the recording light beam radiated by the laser diode 11, the light volume $L_A$ of the recording light beam radiated by the laser diode 11 of the optical head 10 is adjusted so that the difference $(L_A - L_C)$ or the ratio $(L_C/L_A)$ of the light volume $L_A$ of the laser light radiated by the laser diode 11 and the light volume $L_C$ of the reflected light by the optical disc 1 volume equal to a predetermined value, in such a manner that the reflected light volume of the light beam will prove to be an optimum write light volume $L_A$ modulated with a predetermined modulation factor.

The system controller 37 samples the detection output by the photodetector 13 of the optical head 10 by a second sampling pulse $SP_2$ generated by the write pulse generator 24 to control the operation of the laser driving circuit 20 on the basis of the sampling value so that the light volume $L_D$ of the reflected light within a predetermined period $T_S$ after the end of the formation of the recording pit P on the optical disc 1 will be a predetermined light volume for maintaining the reproducing level light volume $L_B$ of the light beam radiated by the laser diode 11 during the period $T_O$ of the write pulse $D_{WR}$ at a predetermined light volume, by way of performing a so-called APC control.

Figure 4:
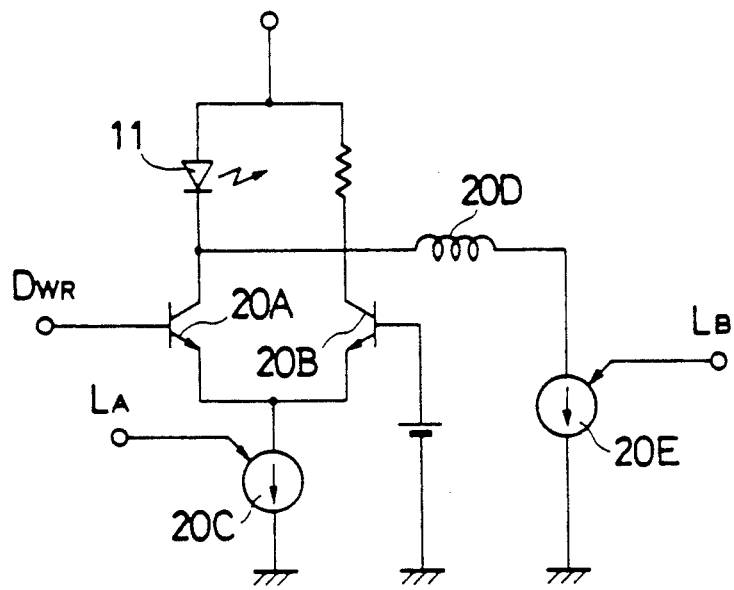
FIG. 4 is a circuit diagram showing a typical construction of a laser driving circuit employed in the above recording/reproducing apparatus.

The laser driving circuit 20 is constituted, as shown for example in FIG. 4, by a pair of differential transistors 20A, 20B one of which has its collector connected to the laser diode 11, a first variable current source 20C connected to the emitters of the differential transistors 20A, 20B and a second variable current source 20E connected by means of a choke coil 20D to a junction between the laser diode 11 and the collector of one of the differential transistors 20A, 20B. With the system controller 37 controlling the current value of the first variable current source 20C, the writing light volume $L_A$ may be automatically set and controlled and the current value of the second variable current source 20E is controlled by way of performing an APC control of the reproducing light volume $L_B$.

Sampling means for sampling the detection output by the photodetector 13 of the optical head 10 by the second sampling pulse $SP_2$ generated by the write pulse generator 24 are provided in each of the spindle servo circuit 34, head servo circuit 35 and the ATIP decoder 35. The spindle servo control operation, head servo control operation and generation and processing of the absolute time data $D_{ATIP}$ are performed on the basis of the detection output from the photodetector 13 during the time period $T_S$ following the end of formation of the recording pit P on the optical disc 1.

That is, the detection output obtained at the photodetector 13 of the optical head 10 during the domain $T_S$ following the end of formation of the recording pit P on the optical disc 1 is the detected reflection light from the unrecorded portion between the recording pits P so that it is not affected by the recording pits P, that is the recording data.

Thus, with the present embodiment, the detection output obtained at the photodetector 13 of the optical head 10 during the time period $T_S$ is utilized to perform the APC control operation by the system controller 37, the spindle servo control operation by the spindle servo circuit 34, the head servo control operation by the head servo circuit 35 and generation and processing of absolute time data $D_{ATIP}$ by the ATIP decoder 35, with a high accuracy, thereby performing a highly reliable recording operation on the optical disc 1.

It will be seen from above that, with the optical recording apparatus of the present invention, the light source is pulse driven with a light volume of the recording level in association with the record data by driving means for irradiating the record light beam corresponding to the record data on the optical recording medium by the light source. This causes pits corresponding to the record data to be formed on the optical recording medium, thereby recording the data on the optical recording medium.

With the optical recording apparatus of the present invention, the above mentioned drive means drive the light source with the light volume of the reproducing level between one record data and a following record data and the light beam is irradiated from the light source on the recording medium for detecting control data from the optical recording medium. The detection means detect the light beam of the light beam radiated by the light source and reflected back from the optical recording medium. On the basis of the detection output by the detection means within a minimum pulse interval of the record data after lapse of a predetermined time until actual pit formation on the optical recording medium by the recording light beam, the control means forms control data from the optical recording medium for performing the above mentioned control operations.

Within the minimum pulse interval of the record data after lapse of a predetermined time until actual pit formation on the optical recording medium by the recording light beam, the detection output by the detection means is not affected by the pits formed on the recording medium in accordance with the record data.

By performing the control operation by control data obtained from the optical recording medium on the basis of the detection output within the above time domain by the detection means, an optimum control operation may be performed without being affected by the pits formed on the optical recording medium in accordance with the record data so that data may be recorded reliably on the optical recording medium.

Therefore, in accordance with the present invention, even with the optical recording/reproducing apparatus in which the optical recording media having a high modulation factor by the record data signals is used, error data of the focusing servo or the tracking servo of the recording light beam or wobbling time data may be positively detected during the record operation mode, thereby realizing a recording operation with high reliability.

What is claimed is:

1. An optical recording apparatus comprising:
    a light source for irradiating an optical recording medium with a pulsed light beam and forming pits in the recording medium for recording data by the light beam;
    driving means for driving said light source with a light intensity at a recording level in accordance with recording data and driving said light source with a light intensity at a reproducing level between a preceding recording data pulses and a following recording data pulse during a recording operation;
    detecting means for detecting a light beam irradiated by said light source and for detecting a light beam reflected by the optical recording medium;
    servo means for controlling the focusing and tracking of the recording light beam on the recording medium; and
    control means for producing a first control signal on the basis of a first sample signal produced by sampling a first output signal from said detecting means, the first output signal being produced by detecting the light beam reflected by the recording medium during a period of pit formation on the recording medium, and for producing a second control signal on the basis of a second sampled signal produced by sampling a second output signal from said detecting means, the second output signal being produced by detecting the light beam reflected from a non-record region between pits formed on the recording medium after a predetermined time interval between recording data pulses, said first control signal being supplied to said driving means to control the light intensity of the light beam irradiated on the recording medium, said second control signal being supplied to said servo means.

2. The optical recording apparatus according to claim 1 wherein said control means comprises sampling means for sampling said first and second output signals from said detecting means.

3. The optical recording apparatus according to claim 2 wherein said control means controls said light source on the basis of the sampled values of the detection output from said detecting means.

* * * * *